United States Patent [19]

Landis, Jr. et al.

[11] 4,187,054
[45] Feb. 5, 1980

[54] TURBINE BAND COOLING SYSTEM

[75] Inventors: Delmer H. Landis, Jr., Loveland; Paul W. Lozier, North Bend; Louis Lievestro, West Chester; Thomas A. Auxier; John H. Starkweather, both of Cincinnati, all of Ohio

[73] Assignee: General Electric Company, Cincinnati, Ohio

[21] Appl. No.: 898,061

[22] Filed: Apr. 20, 1978

[51] Int. Cl.$^2$ ............................ F01D 5/18; F01D 9/04
[52] U.S. Cl. ..................................... 415/115; 415/178
[58] Field of Search ................ 415/115, 178, 179, 116

[56] References Cited
U.S. PATENT DOCUMENTS

| | | | |
|---|---|---|---|
| 3,529,903 | 9/1970 | Scalzo et al. | 415/115 |
| 3,558,237 | 1/1971 | Wall | 415/115 |
| 3,628,880 | 12/1971 | Smuland et al. | 415/115 |
| 3,825,364 | 7/1974 | Halila et al. | 415/178 |
| 3,844,343 | 10/1974 | Burggraf | 415/116 |
| 3,972,181 | 8/1976 | Swayne | 415/115 |
| 4,017,207 | 4/1977 | Bell et al. | 415/178 |

*Primary Examiner*—Everette A. Powell, Jr.
*Assistant Examiner*—A. N. Trausch, III
*Attorney, Agent, or Firm*—Robert C. Lampe, Jr.; Donald W. Walk; Derek P. Lawrence

[57] ABSTRACT

A gas turbine engine comprising a number of annular wall sectors which form a complete circular wall defining a hot gas passage is provided with a cooling system incorporating a plurality of hollow impingement vessels disposed in a circular array within an annular chamber behind the wall. Cooling fluid is routed to the self-contained impingement pressure vessels which are provided with perforations to disperse the cooling fluid into impingement upon the wall. Unlike prior systems, the impingement vessels are not physically attached to the band but, rather, are supported by a structural frame which partially defines the annular chamber and, in the preferred embodiment, also supports the wall sectors. Since the impingement vessel, and not the backside of the wall, is the pressure vessel for the pressurized cooling fluid, leakage between adjacent wall sectors is greatly reduced with no loss in cooling effectiveness when compared to conventional cooling systems. Thus, turbine cycle performance is improved.

10 Claims, 9 Drawing Figures

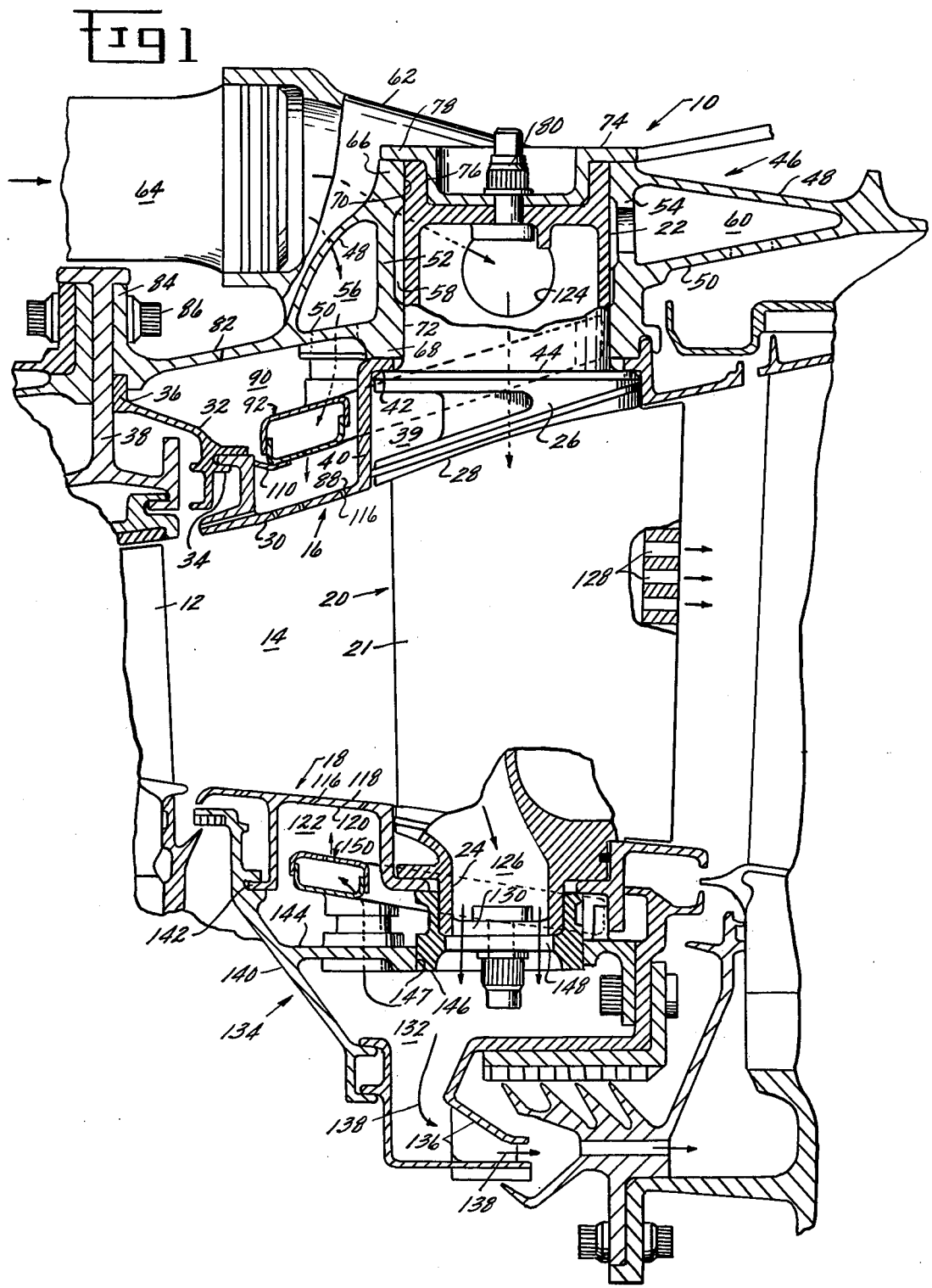

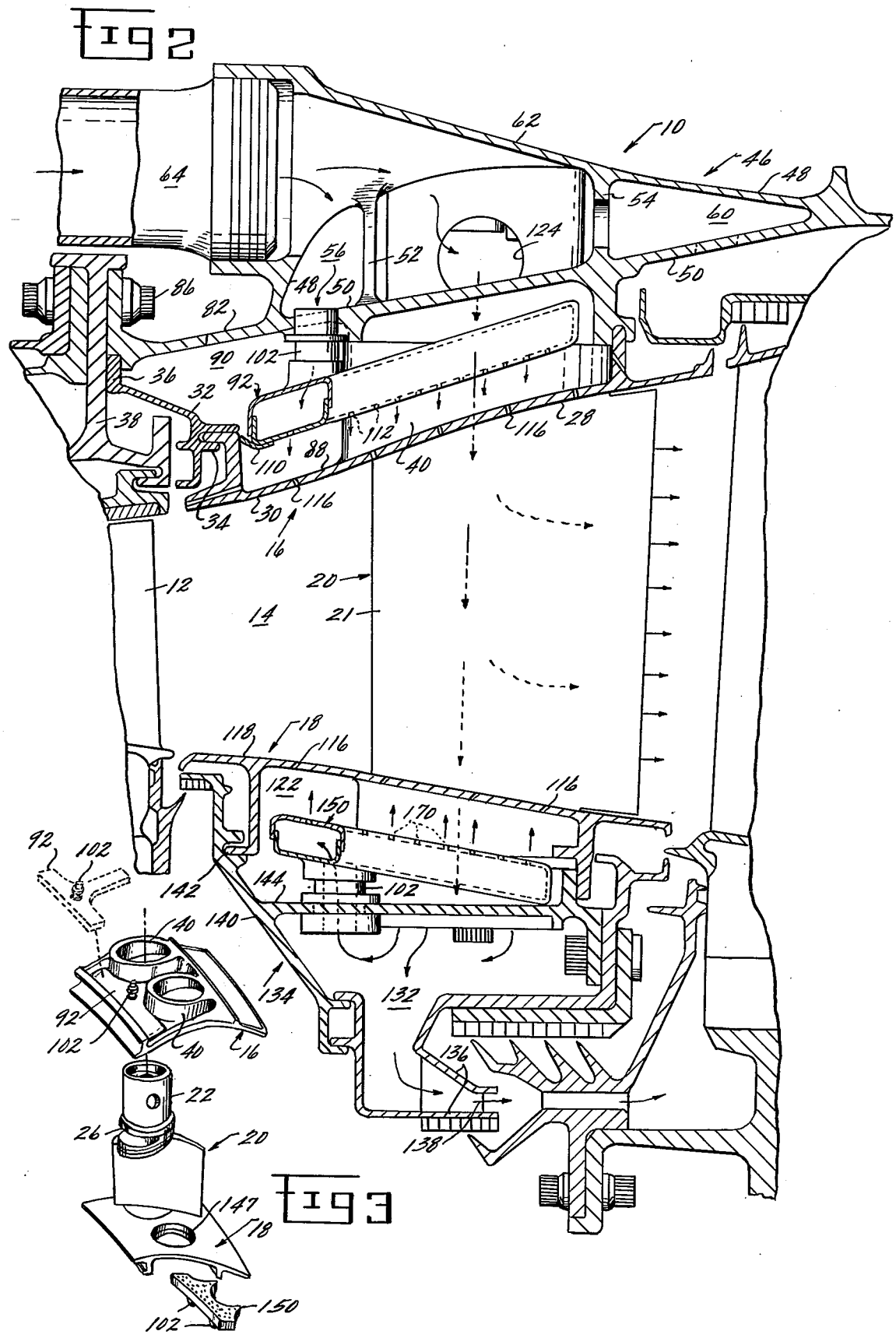

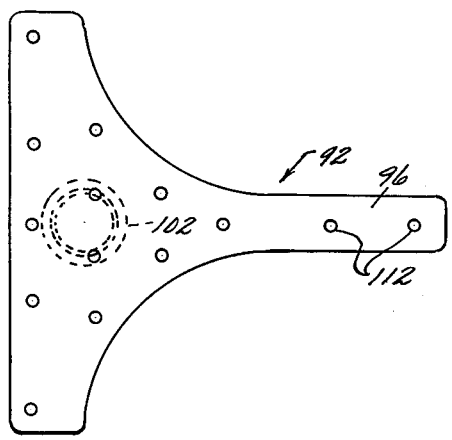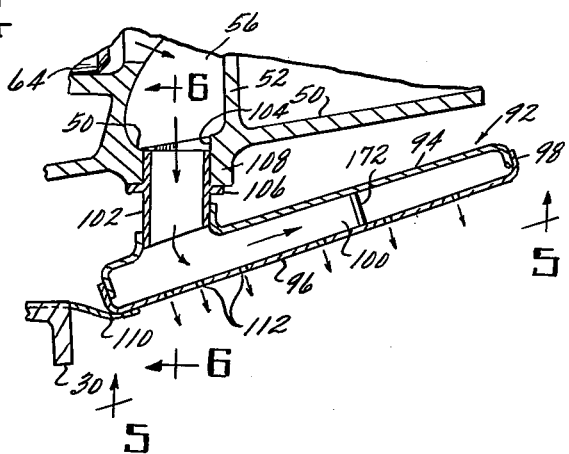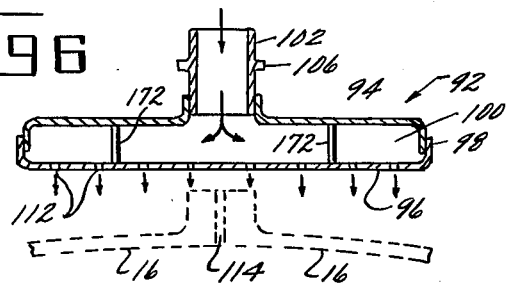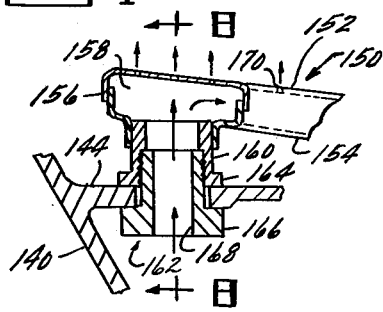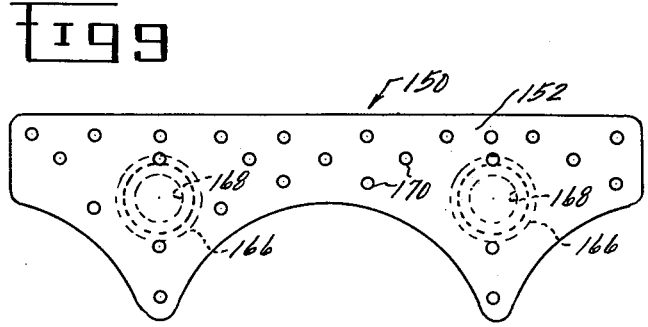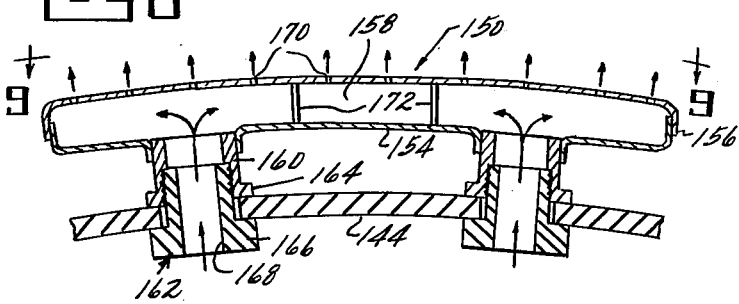

TURBINE BAND COOLING SYSTEM

BACKGROUND OF THE INVENTION

This invention relates generally to cooling systems and, more particularly, to a cooling system for use in high temperature gas turbines.

Cooling of high temperature components in gas turbine engines is one of the most challenging problems facing engine designers today, particularly as it relates to the turbine portions of the engine where temperatures are most severe. While improved high temperature materials have been developed which partially alleviate the problem, it is clear that complete reliance on advanced technology materials will not be practical for the foreseeable future. One reason is that these advanced materials contemplate expensive manufacturing techniques or comprise alloys of expensive metals. Thus, the product, though technically feasible, may not be cost effective. Additionally, as gas turbine temperatures are increased to higher and higher levels, it is clear that no contemplated material, however exotic, can withstand such an environment without the added benefit of supplemental fluid cooling. Fluid cooling, therefore, can permit the incorporation of more cost effective materials into present-day gas turbine engines and will permit the attainment of much higher temperatures (and, therefore, more efficient engines) in the future.

One area of the turbine which is particularly troublesome in this regard is the turbine nozzle band which comprises a number of annular sectors which form a complete circular wall to define a flow path for the operating fluid of the turbomachine through a stage of turbine nozzle vanes. Various fluid cooling techniques have been proposed in the past to cool these band sectors, these various techniques being commonly classified as convection, impingement and film cooling. All of these methods have been tried, both individually and in combination, utilizing the relatively cool pressurized air from the compressor portion of the engine as the coolng fluid. Such prior art concepts are discussed in U.S. Pat. No. 3,800,864, issued to Ambose A. Hauser et al, which is assigned to the assignee of the present invention. Although these various prior art approaches toward cooling turbine nozzle bands are structurally distinguishable, these designs all remove heat in substantially the same manner. That is to say, they all appear to incorporate backside heat convection cavities. These cavities are generally formed by brazing a back plate to the nozzle band, with cooling accomplished either by impinging a fluid coolant from a coolant plenum through the plate and onto the backside of the band or by passing a coolant over a multiplicity of pin fins extending between the band and the plate, thereby heating the coolant and cooling the band. This spent coolant is then dumped as a film over the band hot surface.

Such systems, while basically effective in providing turbine band cooling in many turbine configurations, have several shortcomings. Most importantly, since the turbine band comprises a number of distinct annular sectors which abut each other to form a circular wall, leakage of the pressurized cooling air occurs through the gaps between the ends of adjacent sectors since the driving pressure for impingement cooling of the bands is the same driving pressure for gap leakage. This is particularly true when the cooling air supply pressure is high compared to motive gas stream pressures, such as in the low pressure turbine section of a gas turbofan engine.

Another unsatisfactory characteristic of prior art systems is that they are very expensive to manufacture and difficult (and costly) to repair. Typically, they contemplate intricate castings characterized by a multiplicity of pin fins or coolant passages, or comprise a cast shroud sector to which is brazed a perforated impingement liner which combine to form a single plenum for cooling. While the impingement cooling systems may require less complex castings than their convection-cooled counterparts, they suffer from the disadvantage that particulate matter may become lodged within the liner perforations and substantially reduce the cooling effectiveness. This requires replacement of the entire band sector.

Furthermore, it is a costly and time-consuming process to tune the impingement cooling systems in new turbine designs. Since the band may be subjected to localized heat concentration such as hot streaks, either sufficient air must be supplied to the entire plenum between the band sector and the impingement liner to cool in the area of these hot streaks (i.e., the coolant flow is established by the portion of the sector subjected to the highest temperature --clearly a waste of coolant) or else different impingement liner perforation patterns must be tried, each of which must be brazed to the sector castings. This is a time-consuming process.

Finally, these characteristics are compounded many fold when the turbine is of the variable area variety, employing turbine vanes which are rotatable about their longitudinal axes and which protrude through the annular band sectors. In these turbines, the vane trunnions penetrate the coolant supply cavities, presenting difficult problems of coolant routing and sealing. For example, the gap between variable vane trunnions and band sectors offers another source of coolant leakage.

Minimization of coolant leakage is important since the source of turbine coolant is usually air that is bled from the compressor portion of the engine and, as such, has had work done on it by the compressor. However, since leakage air loses much of its pressure as it flows through the gap and cracks, it does not return its full measure of work to the propulsive cycle. Additionally, the reintroduction of cooling air into the gas stream produces a loss in gas stream total pressure as a result of momentum mixing losses associated with injecting relatively low total pressure cooling air into a high total pressure gas stream. Thus, the greater the amount of cooling air which is lost through leakage, the greater the propulsive cycle efficiency losses become. It will, therefore, be appreciated that a cooling system which reduces leakage between adjacent band sectors will result in a more efficient turbine.

SUMMARY OF THE INVENTION

Accordingly, it is the primary object of the present invention to provide a cooling system which minimizes leakage between adjacent turbine band sectors.

It is a further object of the present invention to provide a turbine of the variable-area type incorporating such a cooling system.

It is another object of the present invention to provide in a turbine a cooling system which is simple to manufacture and which, therefore, reduces manufacturing cost.

It is yet another object of the present invention to provide a turbine having a cooling system which can be easily tuned when incorporated into a new design.

These and other objects and advantages will be more clearly understood from the following detailed description, drawings and specific examples, all of which are intended to be typical of, rather than in any way limiting to, the scope of the present invention.

Briefly stated, the above objectives are accomplished by providing a circular array of hollow impingement vessels disposed in an annular cavity behind the annular wall sectors forming a flow path defining circular wall. Cooling air is routed to the self-contained pressure vessels and dispersed through perforations into impingement against the backside of the wall sectors in the manner of a showerhead. Unlike prior art systems, the impingement vessels are supported by an annular frame instead of being attached to, or part of, the annular wall sectors. In the preferred embodiment, the impingement vessels comprise two thin sheet metal panels, separated radially and brazed about their edges to form to their interior a hollow plenum. One of the panels is provided with perforations for directing fluid into impingement upon the wall sectors, while the other panel includes a supply tube which provides means for routing cooling air into the hollow interior and which also supports the impingement vessels from the frame. When the impingement air strikes the band sectors, it suffers a pressure loss. The pressure in the band backside annular cavity is then that which occurred after impingement, which is the driving influence for film cooling (through holes in the band sectors as is well known in the art) and gap leakage between adjacent sectors. Compared to conventional cooling systems, the supply pressure for film cooling is essentially unchanged, but that for gap leakage is greatly reduced. Furthermore, the impingement vessels can be contoured to fit around and between the trunnions of variable area vanes.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

FIG. 1 is a partial cross-sectional view of the low pressure turbine portion of a gas turbine engine incorporating the present invention;

FIG. 2 is a view similar to FIG. 1 depicting the turbine cooling air circuits in greater detail;

FIG. 3 is an exploded view in trimetric projection depicting the relationship between the turbine band sectors, variable vanes and the impingement vessels;

FIG. 4 is a cross-sectional view taken through the outer band impingement vessel of FIGS. 1 and 2;

FIG. 5 is a plan view of the outer band impingement vessel when viewed generally along line 5—5 of FIG. 4;

FIG. 6 is a cross-sectional view taken along line 6—6 of FIG. 4;

FIG. 7 is a cross-sectional view of a portion of the inner band impingement vessel of FIGS. 1 and 2 depicting its method of installation and mounting in greater particularity;

FIG. 8 is a cross-sectional view taken along line 8—8 of FIG. 7; and

FIG. 9 is a plan view of the inner band impingement vessel when viewed generally along line 9—9 of FIG. 8.

DESCRIPTION OF THE PREFERRED EMBODIMENT

Referring to the drawings wherein like numerals refer to like elements throughout, attention is first directed to FIG. 1 wherein a portion of a variable area turbine, designated generally at 10 and incorporating the present invention is diagrammatically shown in partial section. Turbine 10 comprises the low pressure turbine of a gas turbine engine of the turbofan variety, though it is understood that the term "turbine" as used herein includes high pressure turbines, low pressure turbines and any other variety of machine which extracts energy from a motive fluid by means of blades or vanes. High energy gases of combustion exiting a row of rotating turbine buckets 12, only one of which is shown for simplicity, enter a flow path 14 defined between an outer band made of a number of annular sectors 16 forming a complete circle and an inner band, also preferably made of a number of annular sectors 18, forming a circle concentric with the outer band. Between the bands and spanning flow path 14 is a row of circumferentially spaced, variable area turbine vanes 20, again only one of which is shown for simplicity. Each vane is provided with an airfoil portion 21 of a known air-cooled variety supported by integral cylindrical trunnions 22, 24 at its outer and inner ends, respectively.

Directing attention now to the structure associated with the outer end of vane 20 by which the vane is cantilevered and through which cooling air is routed, it will be noted that each vane is provided with a cylindrical collar 26 between airfoil portion 21 and trunnion 22, the inner surface 28 of which is contoured to partially define flow path 14 through the vanes in cooperation with inner face 30 of outer band sector 16. Band sectors 16 are restrained by outer band support 32 through a sliding tongue-and-groove connection at 34, the outer band support having at its forward end a radially outwardly extending flange 36 which, in turn, is attached to a rigid annular high pressure turbine casing structure 38. Each outer band sector 16 is provided with at least one recessed cavity 39 defined by cylindrical wall portion 40 which is truncated at its inner end to match the contour of inner surface 28 of collar 26 and inner face 30 of its respective sector. Annular flange 42 partially closes the base of each cavity and provides a seat for the step diameter at 44 between collar 26 and trunnion 22 to radially position vane 20.

Surrounding the circle of outer band segment 16 is an annular structural bleed manifold 46 which, in the preferred embodiment of FIGS. 1 and 2, comprises one example of a structural frame having as an additional feature means for routing and distributing cooling fluid to the air-cooled vanes 20. This manifold 46 is described in greater particularity in copending U.S. patent application Ser. No. 898,060, Tuley et al, entitled "Structural Cooling Air Manifold For A Gas Turbine Engine," which is assigned to the assignee of the present invention and the subject matter of which is incorporated herein by reference. Briefly, this structural bleed manifold is an integral casting which retains vanes 20 in their correct position and reacts the high gas loadings upon airfoils 21. Manifold 46 comprises two radially spaced thinly cast walls 48, 50 and a pair of internal stiffening ribs 52, 54 which extend therebetween to define three axially spaced annular plenum chambers 56, 58 and 60. Associated with outer wall 48 are a plurality of circumferentially spaced cylindrical inlet ports 62 which project axially forward and fluidly communicate with a coolant fluid source, such as the intermediate stages of an axial flow compressor, from which relatively cool air is bled and routed rearwardly through bleed conduit 64. This bleed air is distributed circumferentially throughout the annular plenum chambers to provide a source of coolant for each vane.

Each vane is journaled for rotation about its longitudinal axis within structural manifold 46 by means of pairs of aligned embossments 66, 68 of generally circular shape which are machine-bored to provide bearing seats 70, 72, respectively, sized to receive vane trunnions 22. Each vane is restrained by means of diameter step 44 and a dished vane lever 74 which is inserted into a recess 76 at the outer end of each trunnion and which is provided with a generally circular flange 78 which overhangs embossments 66. Vane lever 74 is attached to trunnion 22 by means of bolted connection 80 as shown.

The manifold 46 also includes an axially projecting extension 82 which may be part of the casting or an addition which is welded thereto and which terminates in a circular flange 84. Flange 84 is secured to the rigid, high pressure turbine casing structure 38 by a circle of bolts 86 while simultaneously capturing flange 36 of the outer band support as illustrated. Note that the structural frame represented by manifold 46 and, in particular, by manifold inner wall 50 and extension 82, defines, in cooperation with inner face 88 of outer band sector 16, an annular chamber 90. Recall also that outer face 30 of band sector 16 is exposed to the hot gases of combustion within flow path 14 and that it is therefore necessary to provide cooling for the band sectors. The invention now to be described in a cooling system disposed within annlar chamber 90 to provide adequate band cooling.

Referring now to FIGS. 2 and 4 it may be seen that cooling air, represented by the arrows, flows from inlet ports 62 directly into annular plenum chamber 56 where it is distributed circumferentially. Within annular chamber 90 are a number of hollow impingement vessels 92, hereinafter referred to as impingers, which are disposed in a circular array. Preferably, the number of impingers equals the number of band sectors 16. These impingers 92 are self-cotained pressure vessels comprising a first, or top, sheet metal panel 94 and a spaced apart second, or bottom, sheet metal panel 96, brazed together along their edges at 98 and defining a plenum 100 therebetween. The top panel is provided with means such as a male supply tube 102 which is attached thereto as by brazing and which is inserted into a mating hole 104 through inner manifold wall 50 at annular plenum chamber 56, in close-fitting relationship, to provide fluid communication between chamber 56 and the interior 100 of impinger 92 for introducing cooling air into the impingers. The supply tube is additionally piloted by means of a projecting collar 106 which abuts boss 108 around hole 104, and further support may be obtained in some embodiments by means of standoffs 110 (FIG. 2) which extend between the impinger 92 and band sector 16, and which may be attached to either part. The bottom panel includes means such as a plurality of perforations 112 for directing cooling air from the hollow interior 100 into impingement upon interface 88 band sector 16.

Thus, in operation, impingers 92 are self-contained pressure vessels with perforations which receive coolant from a source such as manifold 46 and which spray the cooling air upon outer band faces 88 (like a shower head) to provide cooling thereof by the impingement principle. As is best shown by the plan form view of FIG. 5 and the cross-sectional view of FIG. 2, the impingers are contoured to fit between adjacent vane trunnions to permit impingement cooling of the outer band face between vanes as well as that circumferential portion of the band upstream of the vanes. FIG. 3 depicts how impingers 92 are fitted between cylindrical walls 40 associated with vane trunnions 22, with a typical impinger being shown installed in solid and removed in phantom. They are structurally unique in that, unlike prior art cooling schemes, the impingers are not physically attached to the bands. Rather, the supply tubes 102 and holes 104 comprise one example of means for supporting the impingers within chamber 90 in radially spaced relationship from face 88. By making a series of separate impingers, low cost sheet metal stampings can be used and production costs should be low enough that nonserviceable impingers could simply be discarded. Moreover, since the impinger is the pressure vessel, and not annular chamber 90 on the backside of band sector 16, split line leakage between adjacent sectors is greatly reduced. This is due to the fact that when the coolant impinges the band sectors, it suffers a pressure loss. The pressure in annular chamber 90 is then that occurring after impingement and is the driving influence for leakage through the inevitable gaps 114 between band sectors 16 (see FIG. 6 in phantom). The spent impingement air can subsequently be routed from chamber 90 through a plurality of inclined holes 116 in the sectors to provide film cooling of outer face 30 in the traditional manner. Thus, compared to a conventional cooling system, the supply pressure for film cooling is essentially unchanged and air supply pressure to holes 116 remains the same as conventional art cooling, but that for leakage between adjacent sectors is greatly diminished.

While the invention has thus far been depicted with particular reference to its adaptability to cooling the outer turbine band sector 16, the concept is equally adaptable to cooling the inner band which is also preferably made of a number of annular sectors 18 forming a complete circle and having an outer face 118 partially defining the hot gas flow path and an inner face 120 partially defining an annular chamber 122 which is analogous to outer annular chamber 90. Cooling air enters hollow trunnion 22 from annular plenum chamber 58 through a pair of opposed holes 124 and flows inwardly through interior vane passages 126 to perform cooling of the airfoil in the known manner, a portion of the coolant exiting the vane trailing edge through a series of holes 128, as shown by the arrows, and leaving edge film holes, not shown. Another portion of the coolant exits through a hole 130 in the inner trunnion 24 and enters a cavity 132 within an inner structural frame designated generally as 134 and comprising an inducer 136, which routes a portion of the coolant radially inwardly and out of cavity 132 as indicated by arrows 138 to perform additional cooling functions not germane to the present invention, and a forward inducer structure 140 which supports band sectors 18 through tongue-and-groove engagement at 142. Forward inducer structure 140 includes a ring 144 which further defines annular chamber 122 and which receives a circumferential row of trunnion extensions 146 which function as inner bearings journaled within machine holes 147 for rotation of the vane about its longitudinal axis. Aligned holes 148 in bearings 146 permit the coolant to enter cavity 132. In a manner analogous to that described with regard to the outer band cooling system, a series of hollow impingement vessels (impingers) 150 are arranged in a circle within chamber 122, the number of impingers preferably, but not necessarily, being equal to the number of inner vane sectors 18.

Referring to FIGS. 7 and 8, impingers 150 are shown in greater particularity. A first, or top, perforated sheet metal panel 152 is brazed to a second, or bottom, sheet metal panel 154 about their periphery 156 to form a pressure vessel having a hollow interior 158. The bottom panel is provided with a pair of supply tubes 160 which are attached to structural frame ring 144 by means of impingement retainers 162 which are threaded into supply tubes 160, thereby capturing ring 144 between cooperating collars 164, 166 on the supply tubes and retainers, respectively. Thus, impingers 150 are supported within chamber 122 entirely by wall 144 through the threaded connection with retainers 162. Additionally, as is best shown in FIGS. 2 and 9, the impingers are contoured to fit around and between trunnions 24 to provide effective cooling of each inner band sector 18. In operation, cooling air entering cavity 132 from vane passageway 126 is routed into impingers 150 through holes 168 in retainers 162 which communicate with the interiors of supply tubes 160. The air is then dispersed through a plurality of perforations 170 into impingement upon inner face 120 of band sectors 18 to provide cooling thereof. It may then be ejected through holes 116 through the sectors to form a cooling film along face 118 in a manner well known in the art.

Thus, it has been demonstrated that the subject matter of the present invention is equally adaptable to cool both the outer and inner bands of a high temperature turbine. It should be obvious to one skilled in the art that certain changes can be made to the above-described invention without departing from the broad inventive concepts thereof. For example, the present invention is equally adaptable to gas turbines utilizing fixed or variable area vanes and, in fact, can be applied to cool any element defining a hot gas passage. Furthermore, in some embodiments it may become desirable to add one or more reinforcement pins 172 between the impinger panels (see FIGS. 4, 6 and 8) to provide structural reinforcement of these self-contained pressure vessels. It is intended that the appended claims cover these and all other variations of the present invention's broader inventive concepts.

Having thus described the invention, what is claimed as novel and desired to be secured by Letters Patent of the United States is:

1. A gas turbine comprising a number of annular wall sectors forming a complete circular wall having first and second faces, the first face bounding a hot gas passage and the second face defining a radially inner portion of an annular chamber; a plurality of hollow impingement vessels disposed in a circular array within said chamber, means for introducing cooling fluid into said impingement vessels and means for directing cooling fluid from said vessels into impingement against the second face to provide cooling thereof;

said turbine further comprising a plurality of variable area vanes each having an airfoil portion and a trunnion extending through said wall sectors and journaled for rotation within said annular chamber, and wherein said impingement vessels are contoured to fit between adjacent vane trunnions to provide impingement cooling of those portions of the second face between adjacent vanes.

2. The turbine as recited in claim 1 further comprising means for supporting said impingement vessels within said chamber in radially spaced relationship from the second face.

3. The turbine as recited in claim 1 wherein said fluid directing means comprises perforations in said impingement vessel wall to provide fluid communication between the hollow interiors and said annular chamber.

4. The turbine as recited in claim 1 further comprising a structural frame for supporting said annular wall sectors in a circular arrangement and further partially defining said annular chamber in cooperation with said second face, and wherein said impingement vessels are supported by said frame within said chamber in radially spaced relationship from the second face.

5. The turbine as recited in claim 4 further comprising a male supply tube attached to each impingement vessel for introducing cooling fluid thereto, and wherein said supply tubes are inserted into close fitting, mating holes in said structural frame.

6. The turbine as recited in claim 4 wherein said structural frame includes a cooling air plenum and each impingement vessel includes a supply tube which is inserted into mating holes in said structural frame to provide fluid communication between said plenum and said impingement vessels.

7. The turbine as recited in claim 6 wherein said supply tubes are inserted into said holes in close fitting relationship to provide means for supporting said impingement vessels within said chamber.

8. The turbine as recited in claim 4 further comprising a cooling air plenum partially defined by said structural frame, a supply tube connected to an impingement vessel and a retainer which is threaded into said supply tube to capture said structural frame therebetween, said retainer being provided with a hole for providing fluid communication between said plenum and said impingement vessel.

9. The turbine as recited in claim 1 wherein said impingement vessels comprise a first panel including perforations for directing cooling fluid into impingement upon the second face, and a second panel spaced from and connected to the first panel including a supply tube for introducing cooling fluid to the space between panels.

10. The turbine as recited in claim 9 further comprising a reinforcing pin connecting the first and second panels together.

* * * * *